3,378,550
SELECTED DERIVATIVES OF 17,17-DIFLUORO-4-ANDROSTENE-3-ONE
George A. Boswell, Wilmington, Del., assignor to E. I. du Pont de Nemours and Company, Wilmington, Del., a corporation of Delaware
No Drawing. Filed Nov. 15, 1966, Ser. No. 594,412
9 Claims. (Cl. 260—239.55)

ABSTRACT OF THE DISCLOSURE

Compounds of the formula

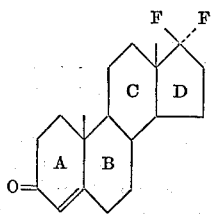

where the C ring is of the structures

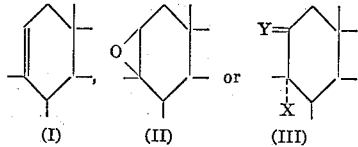

where Y is =O or

and X is halogen. The compounds are prepared through a series of steps, outlined as follows: Adrenosterone and sulfur tetrafluoride give 17,17-difluoro-4-androstene-3,11-dione, which, upon blocking the 3-position with pyrrolidine and treating with lithium aluminum hydride followed by acid, gives 17,17 - difluoro - 11β - hydroxy-4-androstene-3-one. Treatment of the latter compound with N-bromoacetamide gives compound I. Treatment of I with HOBr gives compound III where X is Br and Y is

Reaction of the latter compound with sodium hydroxide produces compound II and treatment of II with HX gives compound III where Y is

This latter compound is converted to compound III where Y is =O by mild oxidation. The products possess therapeutic properties.

This invention relates to new fluorinated steroids. More particularly, it is directed to new steroids having the 17,17-difluoro - 4 - androstene - 3 - one structure.

The compounds of this invention are represented by the formula

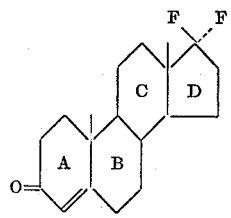

wherein the C ring has a structure selected from the class consisting of

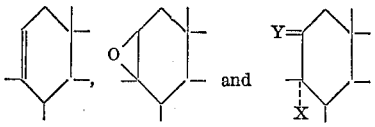

wherein X is selected from the class consisting of fluorine, chlorine and bromine; and Y is selected from the class consisting of

and =O.

The compounds are prepared from 17,17-difluoro-11β-hydroxy-4-androstene-3-one by the reaction sequence shown in the following diagram:

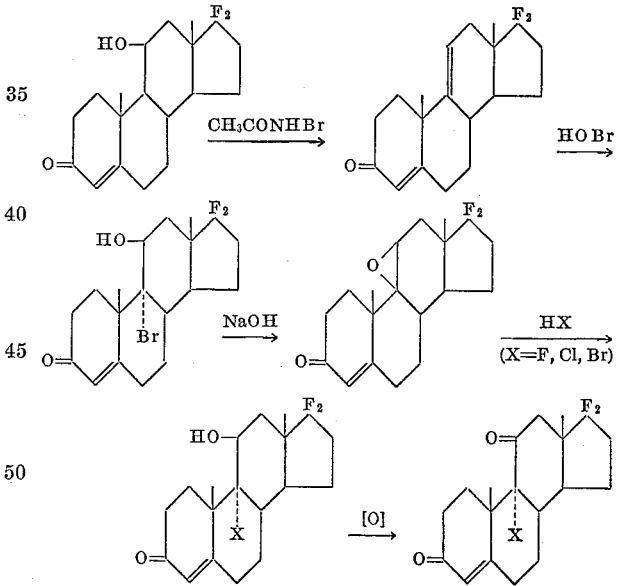

The reactions shown above are described in greater detail in the examples. The starting material, 17,17-difluoro-11β-hydroxy-4-androstene-3-one, from which the compounds of this invention are prepared, is prepared as described in the following Example A:

EXAMPLE A (I) A solution of 10 g. of 4-androstene-3,11,17-trione (adrenosterone) in methylene chloride (100 ml.) containing suspended water (1.5 ml.) was shaken with sulfur tetrafluoride (150 g.) in a pressure vessel at 20±2° C. for 30 hours. The reaction vessel was vented, swept out with a stream of nitrogen, and the contents transferred to a separatory funnel. The methylene chloride solution was washed with water, 5% aqueous sodium bicarbonate, water and saturated aqueous sodium chloride. After drying over magnesium sulfate, the solution was evaporated to dryness under reduced pressure. The residue was crystallized from acetone-petroleum ether to give 6.32 g. of crystalline 17,17-difluoro-4-androstene-3,11-dione. Recrystallization from the same solvent pair gave large tan-colored prisms, M.P. 164–165° C., $[\alpha]_D^{23}$ +209° (c. 2.01, chf.). The analytical sample was sublimed.

*Analysis.*—Calcd. for $C_{19}H_{24}F_2O_2$: C, 70.7; H, 7.50; F, 11.8. Found: C, 70.50; H, 7.55; F, 11.83.

Infrared: $\lambda_{max}^{Nujol}$ 5.85 (C–11 C=O), 5.95 (C–3 conj. C=O), 6.16 (conj. C=C) and 8.59µ ($CF_2$)
Ultraviolet' $\lambda_{max}^{EtOH}$ 237 mµ ($\epsilon$=15,700)

(II) A a solution of 25 g. of 17,17-difluoro-4-androstene-3,11-dione in 425 ml. of methanol was treated with 25 g. of pyrrolidine and the mixture was warmed to 50° C. for about 5 minutes. The crystalline reaction product which precipitated on cooling was separated by filtration and dried under reduced pressure. There was thus obtained 22.3 g. of 17,17-difluoro-3-(N-pyrrolidinyl)-3,5-androstadiene-11-one.

(III) Without further purification, a 10.7 g. portion of this enamine was dissolved in 150 ml. of dry ether and the solution was added gradually with stirring to a suspension of 3 g. of lithium aluminum hydride in 510 ml. of dry ether over a period of about 10 minutes. Stirring was continued for an additional 15 minutes, after which the stirred mixture was treated gradually with 60 ml. of ethyl acetate, followed by 60 ml. of water. After concentrating the reaction mixture under reduced pressure, it was treated with 600 ml. of methanol, then with 108 ml. of 5% sodium hydroxide. After addition of 30 ml. of acetic acid, the mixture was concentrated under reduced pressure. A mixture of 48 ml. of concentrated hydrochloric acid and 300 ml. of water was added, and the solid reaction product was separated by filtration, washed with water and dried. There was obtained 7.24 g. of 17,17-difluoro-11β-hydroxy-4-androstene-3-one which, after recrystallization from acetone-hexane melted at 200–202° C. and had $[\alpha]_D^{23}$ +126° (c. 2.05, $CHCl_3$).

*Analysis.*—Calcd. for $C_{19}H_{26}F_2O_2$: C, 70.3; H, 7.77; F, 11.7. Found: C, 70.12; H, 8.13; F, 11.47.

Ultraviolet: $\lambda_{max}^{EtOH}$ 239 mµ ($\epsilon$=15,300) and 310 mµ ($\epsilon$=130)

The following examples illustrate the compounds of this invention. In these examples, the melting points were recorded as observed on a Kofler block unless noted otherwise. Infrared spectra were recorded from Nujol mulls or micro KBr wafers unless noted otherwise. Ultraviolet spectra were taken in absolute ethanol. The $F^{19}$ and proton N.M.R. spectra were obtained at 56.4 mc./sec.

EXAMPLE 1

17,17-difluoro-4,9(11)-androstadiene-3-one

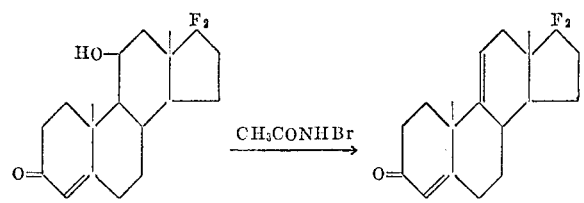

To a solution of 10.7 g. of 17,17-difluoro-11β-hydroxy-4-androstene-3-one in 107 ml. of dry pyridine stirred at room temperature under a nitrogen atmosphere was added 6.4 g. of N-bromoacetamide in one portion. The solution was stirred for 15 minutes, then cooled to 10° C. Sulfur dioxide was bubbled through the solution until the mixture gave a negative test with acidified starch-iodide paper. The mixture was then diluted with 500 ml. of water and cooled in an ice bath. The precipitated reaction product was collected by filtration, washed well with water, dried, and recrystallized from acetone. There was thus obtained 8.43 g. of 17,17-difluoro-4,9(11)-androstadiene-3-one. This was recrystallized once again from acetone to afford thick colorless needles (6.42 g.), M.P. 189–191° C., $[\alpha]_D^{23}$ +90° (c. 2.04, $CHCl_3$).

*Analysis.*—Calcd. for $C_{19}H_{24}F_2O$: C, 74.6; H, 7.88; F, 12.4. Found: C, 74.60; H, 7.90; F, 11.98.

Infrared: $\lambda_{max}^{Nujol}$ 3.27 (=CH), 6.01 (conj. C=O), 6.17 (conj. C=C) and 8.60µ ($CF_2$)
Ultraviolet: $\lambda_{max}^{EtOH}$ 237.5 ($\epsilon$=16,300) and 312 mµ ($\epsilon$=60)

EXAMPLE 2

9α-bromo-17,17-difluoro-11β-hydroxy-4-androstene-3-one

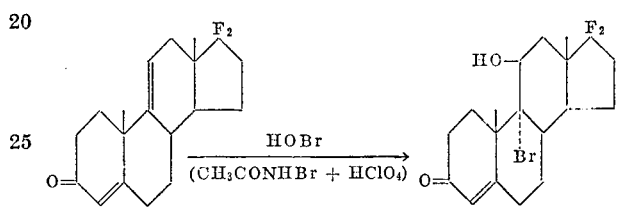

To a solution of 17,17-difluoro-4,9(11)-androstadiene-3-one (1.0 g.) in acetone (50 ml.) was added dropwise with stirring at 15° C. a solution of N-bromoacetamide (1.0 g.) in water (25 ml.). An aqueous 0.8 N perchloric acid solution (20 ml.) was then added slowly at 15° C. After the solution had been stirred for about 20 minutes, a saturated aqueous solution of sodium sulfite was added in sufficient amount to discharge the yellow color. The resultant solution was then diluted with water in order to precipitate the reaction product which was collected on a filter, washed well with water, air-dried and recrystallized from acetone to afford 0.717 g. of 9α-bromo-17,17-difluoro-11β-hydroxy-4-androstene-3-one as bright yellow cubes, M.P. 163.5–164.5° C., $[\alpha]_D^{23}$ +119° (c. 2.05, $CHCl_3$).

*Analysis.*—Calcd. for $C_{19}H_{25}BrF_2O_2$: C, 56.7; H, 6.24; Br, 19.8; F, 9.42. Found: C, 56.81; H, 6.35; Br, 18.50; F, 9.25.

Infrared: $\lambda_{max}^{Nujol}$ 3.02 (OH), 6.06 (conj. C=O), 6.15 (sh. conj. C=C) and 8.55µ ($CF_2$)
Ultraviolet: $\lambda_{max}^{EtOH}$ 242 ($\epsilon$=15.000) and 310 mµ ($\epsilon$=85)

EXAMPLE 3

17,17-difluoro-9,11β-oxide-4-androstene-3-one

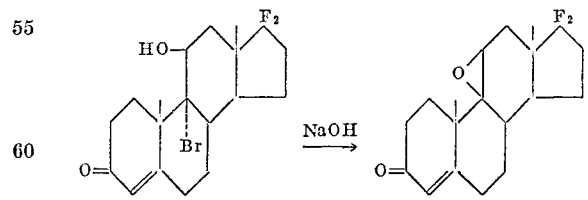

To a stirred solution of 9α-bromo-17,17-difluoro-11β-hydroxy-4-androstene-3-one (1.0 g.) in methanol (50 ml.) at 25° C. was added dropwise a solution of 0.1 N aqueous sodium hydroxide until litmus paper indicated that the solution was basic (light blue color). The solution was diluted with water and then cooled in an ice bath. The precipitated reaction product was collected on a filter, washed well with cold water and air-dried to give 0.8 g. of 17,17-difluoro-9,11β-oxido-4-androstene-3-one. After recrystallization from acetone-hexane, this product was obtained as colorless blades, M.P. 153.5–154° C., $[\alpha]_D^{23}$ −29° (c. 2.07, $CHCl_3$).

*Analysis.*—Calcd. for $C_{19}H_{24}F_2O_2$: C, 70.7; H, 7.48; F, 11.8. Found: C, 70.80; H, 7.47; F, 11.72.

Infrared: $\lambda_{max.}^{Nujol}$ 6.06 (conj. C=O), 6.21 (conj. C=C) and 8.55μ ($CF_2$)
Ultraviolet: $\lambda_{max.}^{EtOH}$ 242 (ε=14,300) and 323 mμ (ε=63)

EXAMPLE 4

9α,17,17-trifluoro-11β-hydroxy-4-androstene-3-one

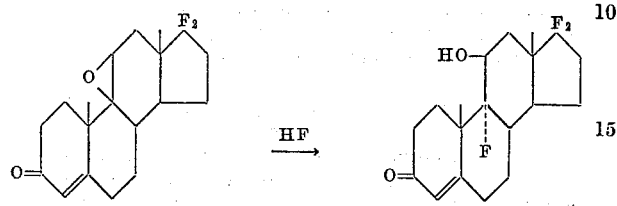

To a stirred solution of anhydrous hydrogen fluoride (7.8 g.) in tetrahydrofuran (14.8 g.) cooled to −60° C. was added solid 17,17-difluoro-9,11β-oxide-4-androstene-3-one (3.6 g.). The resultant homogeneous solution was stirred for 4 hours at −30 to −20° C., after which it was poured into a stirred mixture of aqueous potassium carbonate, ice, and methylene chloride. The mixture was transferred to a separatory funnel and the methylene chloride layer was separated, washed well with water and saturated aqueous salt solution and dried over anhydrous magnesium sulfate. After filtering, the filtrate was evaporated to dryness under reduced pressure. The residue was triturated with cold acetone to give 2.02 g. of 9α,17,17-trifluoro-11β-hydroxy-4-androstene-3-one as well-formed micro cubes, M.P. 297–300° C. (Fisher-Johns Apparatus). After recrystallization from acetone the product melted at 280° C. (dec., sealed capillary) and had $[\alpha]_D^{23}$ +130° (c. 1.51, Py).

*Analysis.*—Calcd. for $C_{19}H_{25}F_3O_2$: C, 66.7; H, 7.34; F, 16.7. Found: C, 66.52; H, 7.26; F, 16.69.

Infrared: $\lambda_{max.}^{Nujol}$ 2.95 (OH), 6.04 (conj. C-3 C=O), 6.14 (conj. C=C) and 8.70μ (C–F)

Ultraviolet: $\lambda_{max.}^{EtOH}$ 237 (ε=16,000), 285 (ε=98) and 320 mμ (ε=62).

The $F^{19}$ N.M.R. spectrum was consistent with the assigned structure.

EXAMPLE 5

9α-chloro-17,17-difluoro-11β-hydroxy-4-androstene-3-one

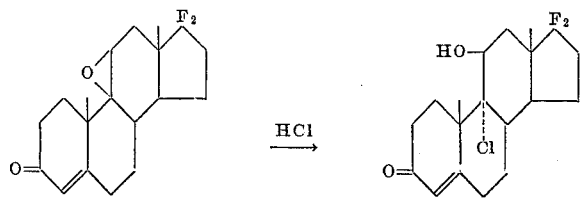

A slow stream of anhydrous hydrogen chloride was passed into a stirred solution of 17,17-difluoro-9,11β-oxido-4-androstene-3-one (2.0 g.) in methylene chloride (35 ml.) at room temperature for 4 hours. The reaction mixture was then washed with water, saturated sodium bicarbonate solution, water, and saturated salt solution and dried over anhydrous magesium sulfate. After filtering, the filtrate was evaporated to dryness under reduced pressure to give an oily product which partly crystallized on standing. This was recrystallized from acetone-hexane to afford 9α-chloro-17,17-difluoro-11β-hydroxy-4-androstene-3-one (0.87 g.) as colorless needles. A portion was recrystallized twice from acetone-hexane to furnish the product as large, pale yellow prisms, M.P. 145–148° C., $[\alpha]_D^{24}$ −2° (c. 1.29, $CHCl_3$).

*Analysis.*—Calcd. for $C_{19}H_{25}ClF_2O_2$: C, 63.8; H, 7.02; Cl, 9.90; F, 10.6. Found: C, 64.55; H, 7.19; Cl, 8.92; F, 10.54.

Infrared: $\lambda_{max.}^{Nujol}$ 3.03 (OH), 6.04 (conj. C-3 C=O), and 6.19μ (conj. C=C)
Ultraviolet: $\lambda_{max.}^{EtOH}$ 243 (ε=15,400) and 3.7 mμ (ε=66)

EXAMPLE 6

9α-bromo-17,17-difluoro-4-androstene-3,11-dione

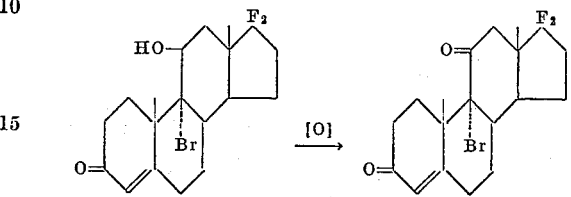

To a solution of 9α-bromo-17,17-difluoro-11β-hydroxy-4-androstene-3-one (4.34 g.) in glacial acetic acid (190 ml.) was added a solution of chromium trioxide (2.38 g.) and water (9.5 ml.) in acetic acid (190 ml.). The mixture was maintained at room temperature for 4.5 hours and then treated with methanol (50 ml.). The solution was evaporated under reduced pressure and the residue mixed with water (180 ml.). The precipitate was filtered, washed with water and dried. Since the infrared spectrum of the crude product showed a strong hydroxyl band as well as 11-keto band, the total product was purified by chromatography on neutral alumina (activity III). Elution with hexane returned traces of gum. Continued elution with 3.5% acetone in hexane afforded a colorless solid which was recrystallized from acetone-hexane to give 1.97 g. of 9α-bromo - 17,17-difluoro-4-androstene-3,11-dione, M.P. 148–150° C. A second crop amounted to 0.11 g. After one more recrystallization from the same solvent pair the product melted at 153.5–154.5° C. and had $[\alpha]_D^{24}$+244° (c. 1.31, $CHCl_3$).

*Analysis.*—Calcd. for $C_{19}H_{23}BrF_2O_2$: C, 57.0; H, 5.78; Br, 19.8; F, 9.48. Found: C, 56.71; H, 5.68; Br, 20.04; F, 9.48.

Infrared: $\lambda_{max.}^{Nujol}$ 5.82 (C-11 C=O), 5.94 (C-3 C=O), 6.10 (conj. C=C) and 8.55μ ($CF_2$)
Ultraviolet: $\lambda_{max.}^{EtOH}$ 237 (ε=14,200) and 316 mμ (ε=152)

By following the same procedure, 9α,17,17-trifluoro-4-androstene-3,11-dione is obtained from 9α,17,17-trifluoro-11β-hydroxy-4-androstene-3-one, and 9α-cholor-17,17-difluoro-4-androstene-3,11-dione is obtained from 9α-chloro-17,17-difluoro-11β-hydroxy-4-androstene-3-one.

The compounds of this invention possess valuable hormonal activities that make them useful in therapeutic applications. As shown by tests on test animals, they have antiandrogenic activity, and some of them, such as 9α,17,17 - trifluoro - 11β-hydroxy-4-androstene-3-one, possess androgen-antiandrogen activity. [This kind of activity is discussed by Dorfman and Dorfman in Acta Endocrinologica 33, 308 (1960)]. In addition, antigonadotrophic activity is present in 9α-bromo-17,17-difluoro-11β-hydroxy-4-androstene-3-one and in 9α,17,17-trifluoro-11β-hydroxy-4-androstene-3-one.

As is known, antiandrogenic steroids are valuable agents in the therapeutic treatment of prostatic carcinoma [see, for example, the article by Huggins in Cancer Research 16, 825 (1956)] and have been proposed in the treatment of other disorders such as postpuberal and idiopatic hirsutism in women, the Stein-Leventhal syndrome, and adolescent and premenstrual acne [see, for example, Saunders et al., Steroids 3, 687 (1964), listing leading references]. Compounds having antigonadotrophic activity find application in the treament of menopausal syndromes and in antifertility drugs.

Furthermore, most of the steroids of this invention, for example, 9α-bromo-17,17-difluoro-11β-hydroxy-4-androstene-3-one, effectively prevent ovulation and implantation in the female rat or rabbit and are thus useful as antifertility agents.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Steroids of the formula

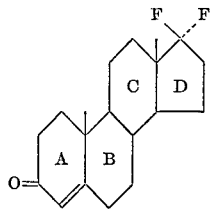

wherein the C ring has a structure selected from the class consisting of

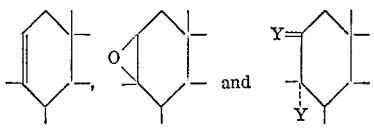

wherein X is selected from the class consisting of fluorine, chlorine and bromine; and Y is selected from the class consisting of

and =O.

2. The steroids of claim 1 wherein the C ring has the structure

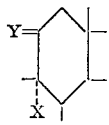

wherein X and Y are defined as in claim 1.

3. The steroids of claim 2 wherein Y is

4. The steroid of claim 1 having the name 17,17-difluoro-4,9(11)-androstadiene-3-one.
5. The steroid of claim 1 having the name 9α-bromo-17,17-difluoro-11β-hydroxy-4-androstene-3-one.
6. The steroid of claim 1 having the name 17,17-difluoro-9,11β-oxido-4-androstene-3-one.
7. The steroid of claim 1 having the name 9α,17,17-trifluoro-11β-hydroxy-4-androstene-3-one.
8. The steroid of claim 1 having the name 9α-chloro-17,17-difluoro-11β-hydroxy-4-androstene-3-one.
9. The steroid of claim 1 having the name 9α-bromo-17,17-difluoro-4-androstene-3,11-dione.

References Cited

UNITED STATES PATENTS 3,163,661  12/1964  Tadanier et al. _____ 260—397.3
3,281,436  10/1966  Tadanier et al. _____ 260—397

ELBERT L. ROBERTS, *Primary Examiner.*

UNITED STATES PATENT OFFICE
CERTIFICATE OF CORRECTION

Patent No. 3,378,550                      April 16, 1968

George A. Boswell

It is certified that error appears in the above identified patent and that said Letters Patent are hereby corrected as shown below:

Column 4, line 52, and Column 5, line 22, "oxide", each occurrence, should read -- oxido --. Column 7, lines 23 to 28, the right-hand formula should appear as shown below:

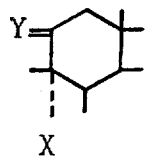

Signed and sealed this 23rd day of September 1969.

(SEAL)
Attest:

Edward M. Fletcher, Jr.                   WILLIAM E. SCHUYLER, JR.
Attesting Officer                          Commissioner of Patents